US007695538B2

(12) United States Patent
Cheng

(10) Patent No.: US 7,695,538 B2
(45) Date of Patent: Apr. 13, 2010

(54) NEGATIVE PRESSURE DUST COLLECTOR WITH A DUST RECEIVING BAG SMOOTHLY INFLATABLE

(75) Inventor: Yun-Tai Cheng, Fongyuan (TW)

(73) Assignee: San Ford Machinery Co., Ltd., Taichung County (TW)

( * ) Notice: Subject to any disclaimer, the term of this patent is extended or adjusted under 35 U.S.C. 154(b) by 130 days.

(21) Appl. No.: 12/190,005

(22) Filed: Aug. 12, 2008

(65) Prior Publication Data

US 2010/0037572 A1 Feb. 18, 2010

(51) Int. Cl.
*B01D 51/00* (2006.01)

(52) U.S. Cl. ............................ 55/467; 55/473; 55/361; 55/372; 55/378; 55/320; 55/413; 55/416; 55/418; 55/334

(58) Field of Classification Search .................. 55/304, 55/305, 467, 473, 361, 372, 374, 378, 413, 55/416, 418, 320, 323, 324
See application file for complete search history.

(56) References Cited

U.S. PATENT DOCUMENTS

| | | | | | |
|---|---|---|---|---|---|
| 2,216,249 | A | * | 10/1940 | Nelson | 285/7 |
| 2,413,499 | A | * | 12/1946 | Hulton | 55/303 |
| 2,483,690 | A | * | 10/1949 | Carlson | 55/300 |
| 2,824,335 | A | * | 2/1958 | Moffat | 15/345 |
| 3,343,199 | A | * | 9/1967 | Nolte | 15/319 |
| 4,276,701 | A | * | 7/1981 | Takacs et al. | 34/109 |
| 4,581,050 | A | * | 4/1986 | Krantz | 55/315.2 |
| 4,715,872 | A | * | 12/1987 | Snyder | 55/315 |
| 4,838,907 | A | * | 6/1989 | Perry | 55/381 |
| 4,917,712 | A | * | 4/1990 | Crigler | 95/280 |
| 4,993,107 | A | * | 2/1991 | Zoni | 15/352 |
| 5,013,333 | A | * | 5/1991 | Beaufoy et al. | 95/20 |
| 5,096,472 | A | * | 3/1992 | Perry | 95/278 |
| 5,169,420 | A | * | 12/1992 | Chen | 55/315 |
| 6,221,135 | B1 | * | 4/2001 | Wirth et al. | 95/273 |
| 6,507,974 | B1 | * | 1/2003 | Cheng | 15/347 |
| 6,797,046 | B2 | * | 9/2004 | Wang | 96/421 |
| D501,964 | S | * | 2/2005 | Cheng | D32/21 |
| D502,297 | S | * | 2/2005 | Cheng | D32/21 |
| 6,875,248 | B1 | * | 4/2005 | Shelton et al. | 55/356 |
| 6,902,594 | B2 | * | 6/2005 | Cho | 55/373 |
| 7,044,991 | B2 | * | 5/2006 | Wang | 55/366 |
| 7,260,868 | B2 | * | 8/2007 | Cheng | 15/347 |
| 2005/0076624 | A1 | * | 4/2005 | Cho | 55/356 |
| 2005/0126136 | A1 | * | 6/2005 | Cheng | 55/341.2 |

* cited by examiner

*Primary Examiner*—Jason M Greene
*Assistant Examiner*—Dung Bui
(74) *Attorney, Agent, or Firm*—Ming Chow; Sinorica, LLC

(57) ABSTRACT

A negative pressure dust collector with a dust receiving bag comprises a ventilation hood and an exhaust device. The ventilation hood includes a motor, fan blades, and a first exit. A dust collection tank is positioned below the first exit. The exhaust device comprises a ventilation tube and a flexible tube.

4 Claims, 3 Drawing Sheets

NEGATIVE PRESSURE DUST COLLECTOR WITH A DUST RECEIVING BAG SMOOTHLY INFLATABLE

BACKGROUND OF THE INVENTION

1. Field of the Invention

This invention relates to a negative pressure dust collector, particularly to one capable of smoothly inflating a dust receiving bag.

2. Description of the Prior Art

As disclosed in Taiwan Patent No. M329475 shown in FIG. 1, a conventional dust collector includes a platform 1, an exhaust fan 2, a dust collection tank 3 and a filtration tank 4. The platform 1 is positioned in the intermediate portion of the dust collector, formed hollow, and provided with a suction tube 11 extended out of its circumferential wall and an opening 12 formed in its bottom to communicate with the suction tube 11. The exhaust fan 2 is provided with a motor 21 fixed next to the opening 12 of the platform 1, and a fan 22 positioned in the platform 1 and connected with the motor 21. The dust collection tank 3 is provided with an opening formed at the top for matching with the opening 12 of the platform 1 to communicate with the hollow interior of the platform 1, and a dust collection bag 31 placed in the interior. The filtration tank 4 is positioned right above the dust collection tank 3, with an opening formed downward to match with the opening 12 of the platform 1 to communicate with the platform 1. A suction tube 42 has its one end connected with an outer wall of the filtration tank 4 and the other end extended inside the interior of the platform 4. The main improvement of the conventional dust collector is that a connecting tube 41 is linked between the wall of the dust collection tank 3 and that of the suction tube 42. In using, when the exhaust fan 2 is turned on, it starts forcing the suction tube 11 and the connecting tube 41 sucked so that the air inside the dust collection tank 3 is to be sucked away to keep the dust collection bag 31 closely attached on the inner wall of the dust collection tank 3. However, as the opening of the connecting tube 41 is perpendicular to the flowing direction of the air sucked, suction in the connecting tube 41 cannot so effectively be achieved that the dust collection bag 31 may be reduced in sucking force.

SUMMARY OF THE INVENTION

The object of this invention is to offer a negative pressure dust collector with a dust receiving bag smoothly inflatable.

The negative pressure dust collector mainly includes a ventilation hood and an exhaust device. The ventilation hood is provided with a motor fixed on its top, plural fan blades confined inside it for pivotally connecting with the motor, a suction tube vertically fixed under the fan blades, and a first exit formed in its bottom. A dust collection tank is positioned below the first exit, provided with a dust receiving bag put inside it. The ventilation hood is further provided with a second exit and an inlet respectively formed at two opposite sides, and a through hole bored in its wall. Connected with the second exit is a dust collection bag. The exhaust device is provided with a ventilation tube and a flexible tube. The ventilation tube is inserted through the through hole into the ventilation hood, with some portion remained outside the ventilation hood. An annular fixing base is formed around the ventilation tube for threadably combined with a wall of the ventilation hood. The ventilation tube is obliquely positioned with a certain angle, having an exit at an upper end to approximately face to the center of the opening of the suction tube, and an inlet at a lower end. A flexible tube is installed outside the ventilation hood, with its upper end connected with the inlet of the ventilation tube, and the other end jointed with the outer wall of the dust collection tank to communicate with the dust collection tank.

BRIEF DESCRIPTION OF DRAWINGS

This invention is better understood by referring to the accompanying drawings, wherein.

DETAILED DESCRIPTION OF THE PREFERRED EMBODIMENT

Figure 1:
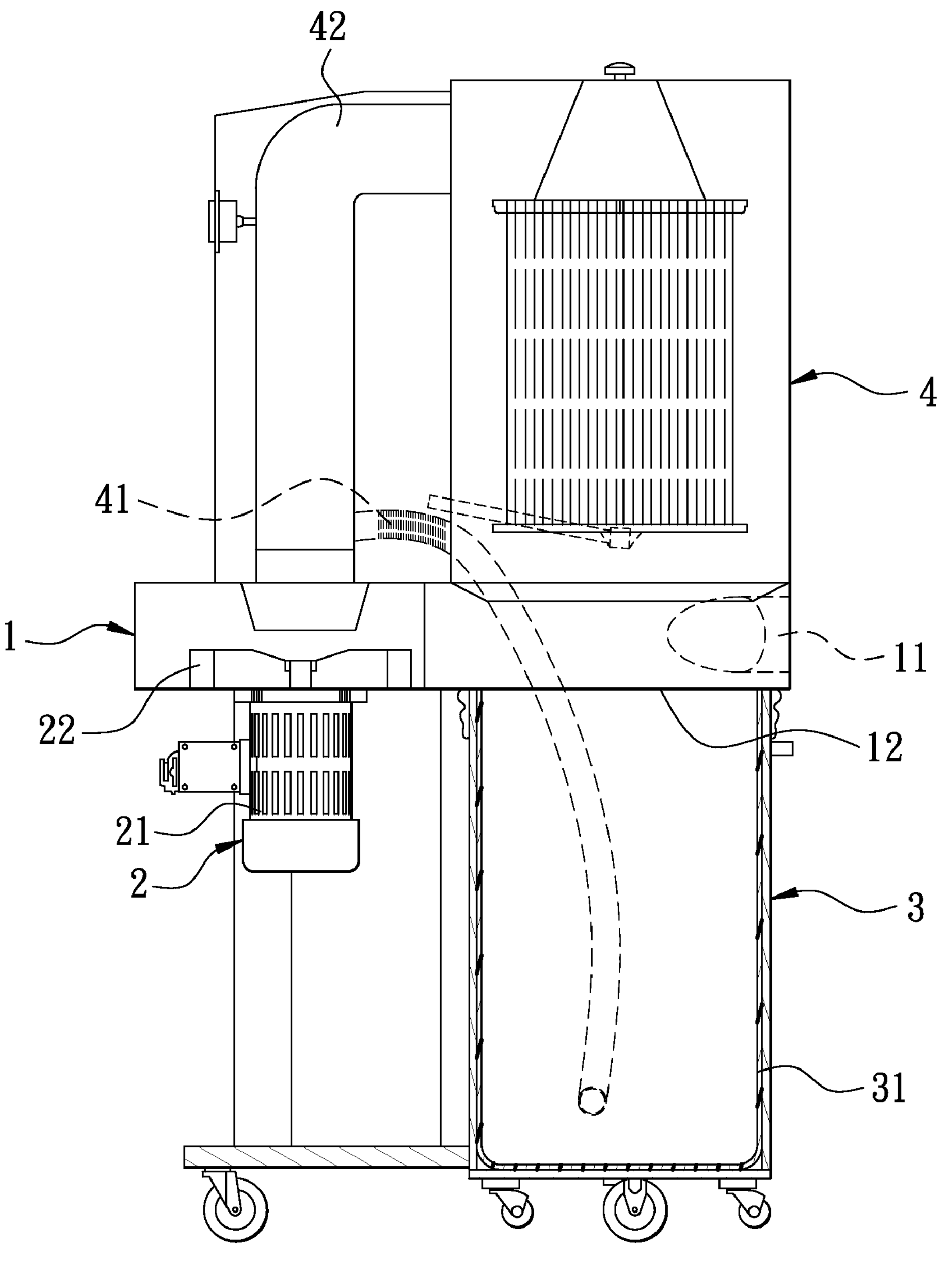
FIG. 1 PRIOR ART
FIG. 1 is a schematic side view of a conventional dust collector.
Figure 2:
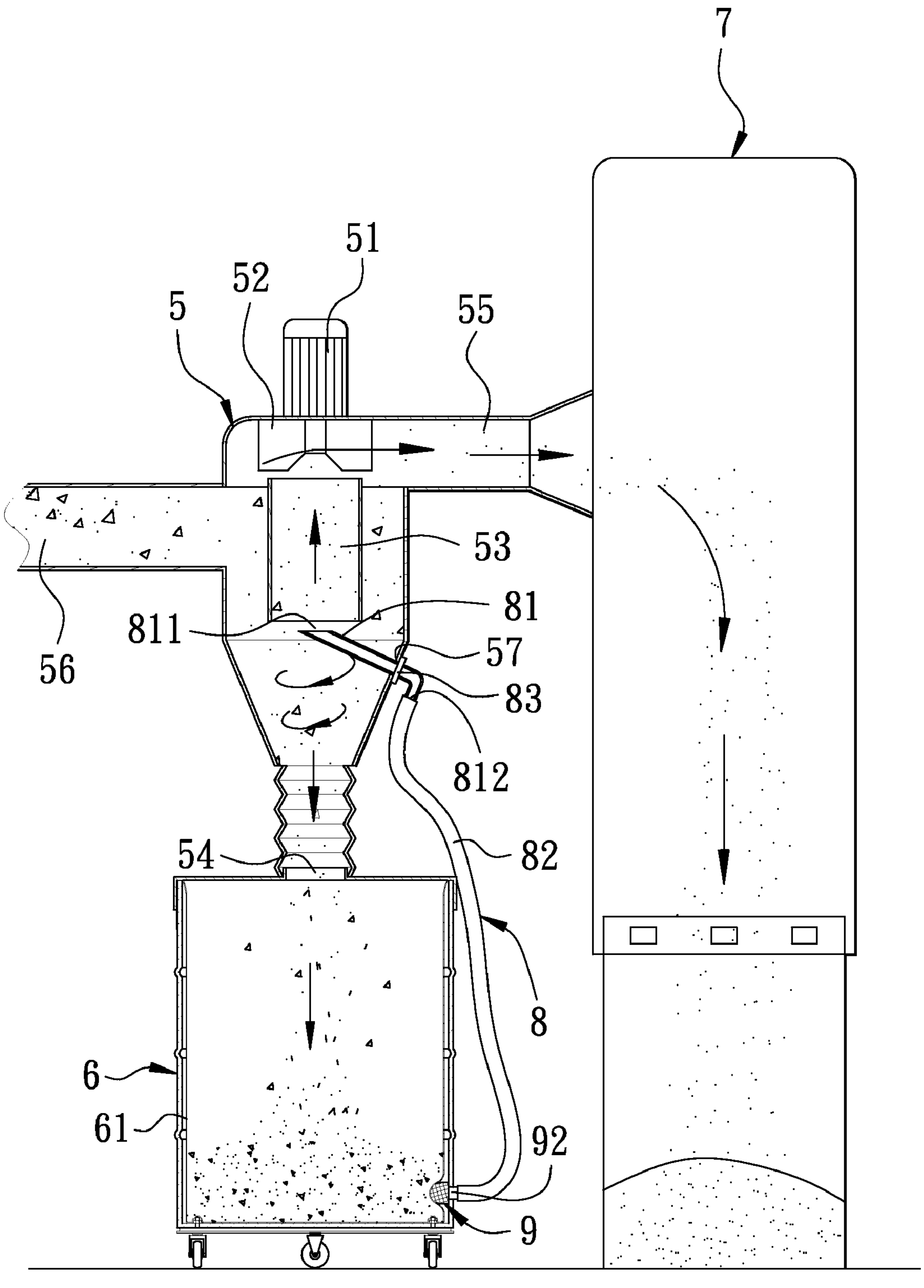
FIG. 2 is a cross-sectional view of a preferred embodiment of a negative pressure dust collector with a dust receiving bag smoothly inflatable in the present invention.
Figure 3:
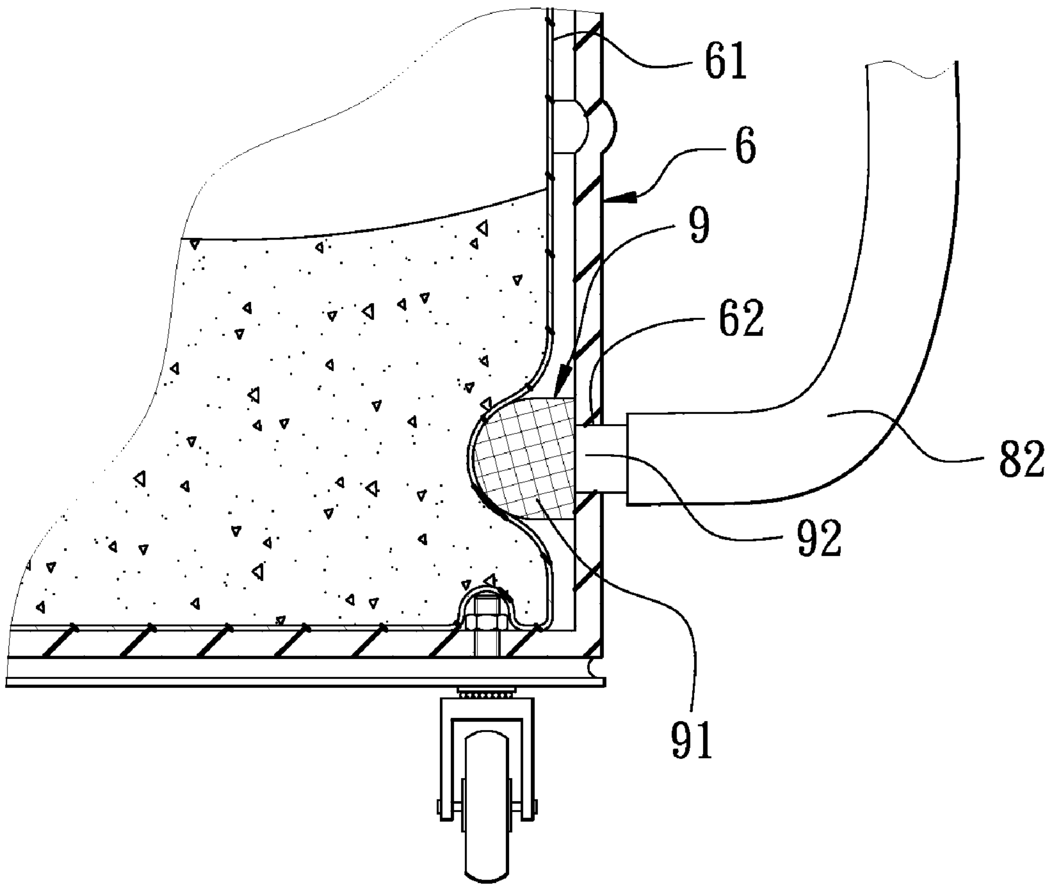
FIG. 3 is a partial cross-sectional view of a preferred embodiment of a negative pressure dust collector with a dust receiving bag smoothly inflatable in the present invention, showing a relationship between a ventilation cap and the dust receiving bag.

As shown in FIGS. 2 and 3, a preferred embodiment of a negative pressure dust collector with a dust receiving bag smoothly inflatable in the present invention includes a ventilation hood 5, a dust collection tank 6, a dust collection bag 7, and an exhaust device 8.

The ventilation hood 5 is provided with a motor 51 fixed on its top, plural fan blades 52 positioned inside it and just under the motor for pivotally connecting with the motor 51, a suction tube 53 vertically fixed under the fan blades 52, and a first exit 54 formed in its bottom, a second exit 55 formed in an upper right side and an inlet 56 formed in a left side, and a through hole 57 bored in an intermediate portion of a right sidewall.

The dust collection tank 6 is positioned just under the first exit 54 of the ventilation hood 5, provided with a dust receiving bag 61 put inside it for receiving comparatively heavy dust particles therein, and an outlet 62 bored in its shell near the bottom. Connected with the second exit 55 is the dust collecting bag 7, which can receive rather light dust coming through the inlet 56, and then to be sucked upward through the sucking tube 53 to be blown into the dust collection bag 7 finally.

The exhaust device 8 is composed of a ventilation tube 81 and a flexible tube 82. The ventilation tube 81 is inserted through the through hole 57 into the ventilation hood 5, with some portion remained outside the ventilation hood 5. An annular fixing base 83 of an L-shaped tube is fixed around the ventilation tube 81 and threadably combined with the wall of the ventilation hood 5. The ventilation tube 81 is obliquely positioned with a certain angle, having an exit 811 at an upper end to approximately face to the center of the lower opening of the suction tube 53, and an inlet 812 formed at a lower end. The exit 811 of the ventilation tube 81 is also positioned at a location just below the center of the fan blades 52. The flexible tube 82 is installed outside the ventilation hood 5, with its upper end connected with the inlet 812 of the ventilation tube 81, and the other end jointed with an outer wall of the dust collection tank 6 to communicate with the dust collection tank 6. Further, a ventilation cap 9 is employed to be fixed inward in the outlet 62 of the dust collection tank 6, provided with a plurality of vents 91 and a tube 92 extended outside the dust collection tank 6 for connecting with the flexible tube 82. The exhaust device 8 is to suck the air existing in a gap between the annular inner wall of the dust collection tank 6 and the dust receiving bag by means of the operation of the fan blades 52.

In using, as the ventilation tube 81 is inserted through the through hole 57 to be obliquely positioned inside the ventilation hood 5 with its exit 811 exactly facing to the fan blades 52, the exit 811 is thus perpendicular to the flowing direction of the air sucked through the inlet 56 of the ventilation hood 5, so that the fan blades 52 rotating can create suction in the ventilation tube 81 and the flexible tube 82, (that is the exhaust device 8), to keep the air existing in a gap between the dust receiving bag 61 and the annular inner wall of the dust collecting tank 6 effectively sucked out of the flexible tube 82, the ventilation tube 81, through the suction tube 53 via the second exit 55 into the dust collection bag 7. Furthermore, the dust receiving bag 61 is to closely contact the annular inner wall of the dust collection tank 6 by means of the exhaust device 8, instead of being sucked toward the first exit 54 of the ventilation hood 5 not to prevent comparatively heavy dust particles from dropping down smoothly in the dust receiving bag 61.

As shown in FIG. 3, it is to be noted that, with the tube 92 of the ventilation cap 9 connected with the flexible tube 82 and fixed in the outlet 62 of the dust collection tank 6, and with the vents 91 formed in the ventilation cap 9, the dust receiving bag 61 is sucked by the sucking function of the exhaust device 9 to closely contact the annular inner wall of the dust collection tank 6, and at the same time prevented from sucked into the lower mouth of the flexible tube 82 to block the air existing in a gap between the dust collection tank 6 and the dust receiving bag 61.

While the preferred embodiment of the invention has been described above, it will be recognized and understood that various modifications may be made therein and the appended claims are intended to cover all such modifications that may fall within the spirit and scope of the invention.

What is claimed is:

1. A negative pressure dust collector with a dust receiving bag smoothly inflatable, said negative pressure dust collector comprising a ventilation hood that is provided with a motor positioned on its top, plural fan blades positioned inside said ventilation hood for pivotally connected with said motor, a suction tube vertically fixed under said fan blades, a first exit formed in a bottom of said ventilation hood, a dust collection tank positioned just under said first exit and provided with a dust receiving bag put inside it for receiving comparatively heavy dust particles, a second exit formed at an upper tight side, an inlet formed at a left side of said ventilation hood, a dust collecting bag connected with said second exit, said dust collector characterized by:

an exhaust device composed of a ventilation tube and a flexible tube, said ventilation tube inserted in said ventilation hood through a through hole bored in an intermediate right side wall of said ventilation hood with some portion remained outside said ventilation hood, an annular fixing base fixed around said ventilation tube for threadably combining with a wall of said ventilation hood, said ventilation tube being obliquely positioned with a certain angle and having an exit at an upper end to approximately face to a center of an opening of said suction tube of said ventilation hood and an outlet formed in a lower wall, said flexible tube installed outside said ventilation hood and having its upper end connected with said inlet of said ventilation tube to communicate with said ventilation tube and a lower end jointed with an outer wall of said dust collection tank to communicate with said dust collection tank.

2. The negative pressure dust collector with a dust receiving bag smoothly inflatable as claimed in claim 1, wherein said exit of said ventilation tube of said exhaust device faces exactly to a center of said fan blades of said ventilation hood.

3. The negative pressure dust collector with a dust receiving bag smoothly inflated as claimed in claim 1, wherein said annular fixing base is an L-shaped tube.

4. The negative pressure dust collector with a dust receiving bag smoothly inflated as claimed in claim 1, wherein a ventilation cap is employed to be fixed inward in said outlet of said dust collection tank, provided with a plurality of vents and a tube extended outside said dust collection tank for connecting with said flexible tube.

* * * * *